(12) United States Patent
Price et al.

(10) Patent No.: US 9,064,318 B2
(45) Date of Patent: Jun. 23, 2015

(54) IMAGE MATTING AND ALPHA VALUE TECHNIQUES

(71) Applicant: Adobe Systems Incorporated, San Jose, CA (US)

(72) Inventors: Brian L. Price, San Jose, CA (US); Scott D. Cohen, Sunnyvale, CA (US); Jacqueline L. Feild, Amherst, MA (US); Gavin Stuart Peter Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 41 days.

(21) Appl. No.: 13/660,159

(22) Filed: Oct. 25, 2012

(65) Prior Publication Data
US 2014/0119643 A1    May 1, 2014

(51) Int. Cl.
*G06K 9/34* (2006.01)
*G06T 7/00* (2006.01)

(52) U.S. Cl.
CPC ..... *G06T 7/0081* (2013.01); *G06T 2207/10024* (2013.01); *G06T 2207/20144* (2013.01)

(58) Field of Classification Search
CPC ............... G06T 7/0081; G06T 2207/20144; G06T 2207/10024; G06F 3/04842; G06F 3/167; H04N 7/141; H04N 7/147; H04N 1/15; H04N 5/226; H04N 5/272
USPC ......... 382/100, 162, 164, 165, 166, 167, 173, 382/260; 348/275
See application file for complete search history.

(56) References Cited

U.S. PATENT DOCUMENTS

| | | |
|---|---|---|
| 5,151,998 A | 9/1992 | Capps |
| 5,652,828 A | 7/1997 | Silverman |
| 5,671,283 A | 9/1997 | Michener et al. |
| 6,122,375 A | 9/2000 | Takaragi et al. |
| 6,208,348 B1 | 3/2001 | Kaye |
| 6,266,412 B1 | 7/2001 | Berenzweig et al. |
| 6,316,712 B1 | 11/2001 | Laroche |
| 6,333,983 B1 | 12/2001 | Enichen et al. |
| 6,370,247 B1 | 4/2002 | Takaragi et al. |
| 6,480,957 B1 | 11/2002 | Liao et al. |
| 6,778,667 B1 | 8/2004 | Bakhle et al. |

(Continued)

FOREIGN PATENT DOCUMENTS

WO    WO-2010086317    8/2010

OTHER PUBLICATIONS

"Non-Final Office Action", U.S. Appl. No. 13/680,952, Aug. 4, 2014, 8 pages.

(Continued)

*Primary Examiner* — Ali Bayat
(74) *Attorney, Agent, or Firm* — Wolfe-SBMC

(57) ABSTRACT

Image matting and alpha value techniques are described. In one or more implementations, techniques are described in which matting operations are applied to image data that is in a raw or substantially raw image format. This may be used to decompose image data into foreground and background images as well as to generate an alpha value that describes a linear combination of the foreground and background images for a respective pixel. Further, implementations are also described in which a plurality of alpha values is generated for each of a plurality of pixels. These alpha values may be utilized to support a variety of different functionality, such as matting operations and so on.

20 Claims, 9 Drawing Sheets

(56) References Cited

U.S. PATENT DOCUMENTS

| | | | |
|---|---|---|---|
| 6,792,113 B1 | 9/2004 | Ansell et al. |
| 6,804,355 B1 | 10/2004 | Graunke |
| 7,003,107 B2 | 2/2006 | Ananth |
| 7,103,181 B2 | 9/2006 | Ananth |
| 7,130,467 B1 | 10/2006 | Bronder et al. |
| 7,142,669 B2 | 11/2006 | Dworkin et al. |
| 7,200,226 B2 | 4/2007 | Bace |
| 7,213,156 B2 | 5/2007 | Fukuda |
| 7,218,733 B2 | 5/2007 | Li et al. |
| 7,221,756 B2 | 5/2007 | Patel et al. |
| 7,269,664 B2 | 9/2007 | Hutsch et al. |
| 7,269,854 B2 | 9/2007 | Simmons et al. |
| 7,350,070 B2 | 3/2008 | Smathers et al. |
| 7,400,744 B2 | 7/2008 | Nichani et al. |
| 7,412,060 B2 | 8/2008 | Fukuda |
| 7,418,100 B2 | 8/2008 | McGrew et al. |
| 7,536,016 B2 | 5/2009 | Benaloh |
| 7,603,563 B2 | 10/2009 | Ansell et al. |
| 7,636,691 B2 | 12/2009 | Maari |
| 7,680,269 B2 | 3/2010 | Nicolai et al. |
| 7,693,278 B2 | 4/2010 | Hiramatsu et al. |
| 7,715,591 B2 | 5/2010 | Owechko et al. |
| 7,757,299 B2 | 7/2010 | Robert et al. |
| 7,827,408 B1 | 11/2010 | Gehringer et al. |
| 7,836,311 B2 | 11/2010 | Kuriya et al. |
| 7,861,312 B2 | 12/2010 | Lee et al. |
| 7,884,854 B2 | 2/2011 | Banner et al. |
| 7,924,323 B2 | 4/2011 | Walker et al. |
| 8,051,287 B2 | 11/2011 | Shetty et al. |
| 8,082,592 B2 | 12/2011 | Harris |
| 8,095,795 B2 | 1/2012 | Levy |
| 8,099,519 B2 | 1/2012 | Ueda et al. |
| 8,103,505 B1 | 1/2012 | Silverman et al. |
| 8,130,952 B2 | 3/2012 | Shamoon et al. |
| 8,184,182 B2 | 5/2012 | Lee et al. |
| 8,189,769 B2 | 5/2012 | Ramasamy et al. |
| 8,199,216 B2 * | 6/2012 | Hwang | 348/223.1 |
| 8,245,033 B1 | 8/2012 | Shetty et al. |
| 8,291,219 B2 | 10/2012 | Eto |
| 8,300,812 B2 | 10/2012 | Van De Ven |
| 8,315,396 B2 | 11/2012 | Schreiner et al. |
| 8,345,976 B2 | 1/2013 | Wang et al. |
| 8,390,704 B2 | 3/2013 | Wang et al. |
| 8,417,806 B2 | 4/2013 | Chawla et al. |
| 8,428,390 B2 | 4/2013 | Li et al. |
| 8,520,083 B2 | 8/2013 | Webster et al. |
| 8,543,386 B2 | 9/2013 | Oh et al. |
| 8,548,226 B2 | 10/2013 | Sakano et al. |
| 8,571,305 B2 | 10/2013 | Kao |
| 8,571,308 B2 * | 10/2013 | Grafulla-Gonzalez | 382/162 |
| 8,583,443 B2 | 11/2013 | Misawa |
| 8,586,847 B2 | 11/2013 | Ellis et al. |
| 8,615,108 B1 | 12/2013 | Stoppa et al. |
| 8,619,082 B1 | 12/2013 | Ciurea et al. |
| 8,694,319 B2 | 4/2014 | Bodin et al. |
| 8,731,913 B2 | 5/2014 | Zopf et al. |
| 8,738,633 B1 | 5/2014 | Sharifi et al. |
| 8,805,560 B1 | 8/2014 | Tzanetakis et al. |
| 8,879,731 B2 | 11/2014 | Schultz |
| 8,886,543 B1 | 11/2014 | Sharifi et al. |
| 8,903,088 B2 | 12/2014 | Schultz |
| 8,914,290 B2 | 12/2014 | Hendrickson et al. |
| 8,953,811 B1 | 2/2015 | Sharifi et al. |
| 2002/0154779 A1 | 10/2002 | Asano et al. |
| 2004/0030656 A1 | 2/2004 | Kambayashi et al. |
| 2005/0015343 A1 | 1/2005 | Nagai et al. |
| 2005/0201591 A1 | 9/2005 | Kiselewich |
| 2005/0232463 A1 | 10/2005 | Hirvonen et al. |
| 2006/0045211 A1 | 3/2006 | Oh et al. |
| 2006/0078194 A1 | 4/2006 | Fradkin et al. |
| 2006/0122839 A1 | 6/2006 | Li-Chun Wang et al. |
| 2006/0173846 A1 | 8/2006 | Omae et al. |
| 2007/0041663 A1 | 2/2007 | Cho et al. |
| 2007/0061145 A1 | 3/2007 | Edgington et al. |
| 2007/0070226 A1 * | 3/2007 | Matusik et al. | 348/275 |
| 2007/0087756 A1 | 4/2007 | Hoffberg |
| 2007/0291958 A1 | 12/2007 | Jehan |
| 2008/0120230 A1 | 5/2008 | Lebegue et al. |
| 2009/0055139 A1 | 2/2009 | Agarwal et al. |
| 2009/0125726 A1 | 5/2009 | Iyer et al. |
| 2009/0259684 A1 | 10/2009 | Knight et al. |
| 2009/0276628 A1 | 11/2009 | Cho et al. |
| 2009/0279697 A1 | 11/2009 | Schneider |
| 2009/0290710 A1 | 11/2009 | Tkachenko et al. |
| 2009/0307489 A1 | 12/2009 | Endoh |
| 2009/0315670 A1 | 12/2009 | Naressi et al. |
| 2010/0105454 A1 | 4/2010 | Weber |
| 2010/0153747 A1 | 6/2010 | Asnaashari et al. |
| 2010/0172567 A1 | 7/2010 | Prokoski |
| 2010/0208779 A1 | 8/2010 | Park et al. |
| 2010/0246816 A1 | 9/2010 | Thomas et al. |
| 2010/0257368 A1 | 10/2010 | Yuen |
| 2010/0279766 A1 | 11/2010 | Pliska et al. |
| 2010/0322042 A1 | 12/2010 | Serletic et al. |
| 2011/0043864 A1 | 2/2011 | Tian et al. |
| 2011/0112670 A1 | 5/2011 | Disch et al. |
| 2011/0131219 A1 | 6/2011 | Martin-Cocher et al. |
| 2011/0161669 A1 | 6/2011 | Eto |
| 2011/0173208 A1 | 7/2011 | Vogel |
| 2012/0042167 A1 | 2/2012 | Marking et al. |
| 2012/0056982 A1 | 3/2012 | Katz et al. |
| 2012/0173865 A1 | 7/2012 | Swaminathan |
| 2012/0173880 A1 | 7/2012 | Swaminathan |
| 2012/0216300 A1 | 8/2012 | Vivolo et al. |
| 2012/0219229 A1 | 8/2012 | Springer et al. |
| 2012/0321172 A1 | 12/2012 | Jachalsky et al. |
| 2013/0113881 A1 | 5/2013 | Barnum |
| 2013/0132733 A1 | 5/2013 | Agrawal et al. |
| 2013/0142330 A1 | 6/2013 | Schultz |
| 2013/0142331 A1 | 6/2013 | Schultz |
| 2013/0173273 A1 | 7/2013 | Kuntz et al. |
| 2013/0191491 A1 | 7/2013 | Kotha et al. |
| 2013/0290818 A1 | 10/2013 | Arrasvuori et al. |
| 2013/0343606 A1 | 12/2013 | Dal Mutto et al. |
| 2014/0023291 A1 | 1/2014 | Lin |
| 2014/0135962 A1 | 5/2014 | King et al. |
| 2014/0136976 A1 | 5/2014 | King et al. |
| 2014/0140626 A1 | 5/2014 | Cho |
| 2014/0142947 A1 | 5/2014 | King |
| 2014/0152776 A1 | 6/2014 | Cohen |
| 2014/0153816 A1 | 6/2014 | Cohen |
| 2014/0168215 A1 | 6/2014 | Cohen |
| 2014/0169660 A1 | 6/2014 | Cohen |
| 2014/0177903 A1 | 6/2014 | Price |
| 2014/0201630 A1 | 7/2014 | Bryan |
| 2014/0310006 A1 | 10/2014 | Anguera Miro et al. |

OTHER PUBLICATIONS

"Notice of Allowance", U.S. Appl. No. 13/309,982, Jul. 30, 2014, 6 pages.

"Notice of Allowance", U.S. Appl. No. 13/310,032, Aug. 26, 2014, 6 pages.

"Restriction Requirement", U.S. Appl. No. 13/660,159, Jun. 12, 2014, 6 pages.

Kubo, Shiro et al., "Characterization of the Tikhonov Regularization for Numerical Analysis of Inverse Boundary Value Problems by Using the Singular Value Decomposition", *Inverse Problems in Engineering Mechanics, 1998*, (1998), pp. 337-344.

"Final Office Action", U.S. Appl. No. 13/309,982, (Nov. 1, 2013), 34 pages.

"Final Office Action", U.S. Appl. No. 13/310,032, (Oct. 31, 2013), 21 pages.

Felzenszwalb, Pedro F., et al., "Efficient Belief Propagation for Early Vision", *International Journal of Computer Vision*, 70(1), (2006), pp. 41-54.

Gastal, Eduardo S., et al., "Shared Sampling for Real-Time Alpha Matting", *Eurographics 2010*, vol. 29, No. 2, (2010),10 pages.

He, Kaiming et al., "A Global Sampling Method for Alpha Matting", *CVPR 2011*, (2011), pp. 2049-2056.

Levin, Anat et al., "A Closed Form Solution to Natural Image Matting", *CVPR*, 2006, 8 pages.

(56) References Cited

OTHER PUBLICATIONS

Park, Youngja et al., "Extracting Salient Keywords from Instructional Videos Using Joint Text, Audio and Visual Cues", *Proceedings of the Human Language Technology Conference of the North American Chapter of the ACL*, Association for Computational Linguistics, (Jun. 2006), pp. 109-112.
Radhakrishnan, Regunathan et al., "A Content-Adaptive Analysis and Representation Framework for Audio Event Discovery from "Unscripted" Multimedia", *Hindawi Publishing Corporation, EURASIP Journal on Applied Signal Processing*, vol. 2006, Article ID 89013, (2006), 24 pages.
Smaragdis, Paris "A Probabilistic Latent Variable Model for Acoustic Modeling", *NIPS* (2006), 6 pages.
Smaragdis, Paris "Supervised and Semi-Supervised Separation of Sounds from Single-Channel Mixtures", *ICA '07 Proceedings of the 7th international conference on Independent component analysis and signal separation*, (2007), 8 pages.
Smith, Alvy R., et al., "Blue Screen Matting", *SIGGRAPH 96 Conference Proceedings*, (Aug. 1996), 10 pages.
Yang, Qingxiong et al., "A Constant-Space Belief Propagation Algorithm for Stereo Matching", *CVPR*, (2010), 8 pages.
"Non-Final Office Action", U.S. Appl. No. 13/309,982, (Jan. 17, 2013), 32 pages.
"Non-Final Office Action", U.S. Appl. No. 13/310,032, (Jan. 3, 2013), 18 pages.
"Time Domain Pitch Scaling using Synchronous Overlap and Add", retrieved from <http://homepages.inspire.net.nz/~jamckinnon/report/sola.htm> on Feb. 12, 2012, 3 pages.
"Waveform Similarity Based Overlap-Add (WSOLA)", retrieved from <http://www.pjsjp.org/pjmedia/docs/html/group__PJMED__WSOLA.htm> on Nov. 12, 2012, 4 pages.
De Gotzen, Amalia et al., "Traditional (?) Implementations of a Phase-Vocoder: The Tricks of the Trade", *Proceedings of the COST G-6 Conference on Digital Audio Effects* (DAFX-00), Verona, Italy, Dec. 7-9, 2000, retrieved from <http://128.112.136.35/courses/archive/spring09/cos325/Bernardini.pdf> on Nov. 12, 2012,(Dec. 7, 2000), 7 pages.
Dolson, Mark "The Phase Vocoder: A Tutorial", retrieved from <http://www.panix.com/~jens/pvoc-dolson.par> Nov. 12, 2012, 11 pages.
Gutierrez-Osuna, Ricardo "L19: Prosodic Modification of Speech", Lecture based on [Taylor, 2009, ch. 14; Holmes, 2001, ch. 5; Moulines and Charpentier, 1990], retrieved from <http://research.cs.tamu.edu/prism/lectures/sp/l19.pdf> on Nov. 12, 2012, 35 pages.
He, et al., "Corner detector based on global and local curvature properties", Retrieved from <http://hub.hku.hk/bitstream/10722/57246/1/142282.pdf> on Dec. 21, 2012, (May 2008), 13 pages.
Hirsch, et al., "Fast Removal of Non-uniform Camera Shake", Retrieved from <http://webdeav.is.mpg.de/pixel/fast_removal_of_camera_shake/files/Hirsch_ICCV2011_Fast%20removal%20of%20non-uniform%20camera%20shake.pdf> on Dec. 21, 2012, 8 pages.
Jia, Jiaya "Single Image Motion Deblurring Using Transparency", Retrieved from <http://www.cse.cuhk.edu.hk/~leojia/all_final_papers/motion_deblur_cvpr07.pdf> on Dec. 21, 2012, 8 pages.
Klingbeil, Michael "SPEAR: Sinusoidal Partial Editing Analysis and Resynthesis", retrieved from <http://www.klingbeil.com/spear/> on Nov. 12, 2012, 3 pages.
Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.
McAulay, R.J., et al., "Speech Processing Based on a Sinusoidal Model", *The Lincoln Laboratory Journal*, vol. 1, No. 2, 1998, retrieved from <http://www.ll.mit.edu/publicatons/journal/pdf/vol01_no2/1.2.3.speechprocessing.pdf> on Nov. 12, 2012,(1988),pp. 153-168.
Moinet, Alexis et al., "PVSOLA: A Phase Vocoder with Synchronized Overlap-Add", *Proc. of the 14th Int. Conference on Digital Audio Effects* (DAFx-11), Paris, France, Sep. 19-23, 2011, retrieved from <http://tcts.fpms.ac.be/publications/papers/2011/dafx2011_pvsola_amtd.pdf> on Nov. 12, 2012,(Sep. 19, 2011),7 pages.
Patton, Joshua "ELEC 484 Project—Pitch Synchronous Overlap-Add", retrieved from <http://www.joshpatton.org/yeshua/Elec484_files/ELEC%20484%20-%20PSOLA%20Final%20Project%20Report.pdf> on Nov. 12, 2012, 11 pages.
Rodet, Xavier "Musical Sound Signal Analysis/Synthesis: Sinusoidal+ Residual and Elementary Waveform Models", *TFTS'97* (*IEEE Time-Frequency and Time-Scale Workshop 97*), Conventry, Grande Bretagne, août, 1997, retrieved from <http:articles.ircam.fr/textes/Rodet97e/index.html> on Nov. 12, 2012,(1997), 16 pages.
Roelands, Marc et al., "Waveform Similarity Bases Overlap-Add (WSOLA) for Time-Scale Modification of Speech: Structures and Evaluation", retrieved from <http://citeseerx.ist.psu.edu/viewdoc/summary?doi=10.1.1.58.1356> on Nov. 12, 2012, 4 pages.
Serra, Xavier "A System for Sound Analysis/Transformation/Synthesis Based on a Deterministic Plus Stochastic Decomposition", retrieved from <https://ccrma.stanford.edu/files/papers/stanm58.pdf> on Nov. 12, 2012, (Oct. 1989), 166 pages.
Serra, Xavier "Approaches to Sinusoidal Plus Residual Modeling", retrieved from <http://www.dtic.upf.edu/~xserra/cursos/CCRMA-workshop/lectures/7-SMS-related-research.pdf> on Nov. 11, 2012, 21 pages.
Serra, Xavier "Musical Sound Modeling with Sinusoids Plus Noise", published in C. Roads, S. Pope, A. Picialli, G. De Poli, editors. 1997. "Musical Signal Processing". Swets & Zeitlinger Publishers, retrieved from <http://web.media.mit.edu/~tristan/Classes/MAS.945/Papers/Technical/Serra_SMS_97.pdf> on Nov. 12, 2012,(1997),25 pages.
Smith III, Julios O., "MUS421/EE367B Applications Lecture 9C: Time Scale Modification (TSM) and Frequency Scaling/Shifting", retrieved from <https://ccrma.stanford.edu/~jos/TSM/TSM.pdf> on Nov. 12, 2012, (Mar. 8, 2012),15 pages.
Upperman, Gina "Changing Pitch with PSOLA for Voice Conversion", retrieved from <http://cnx.org/content/m12474/latest/?collection=col10379/1.1> on Nov. 12, 2012, 1 page.
Verhelst, Werner "Overlap-Add Methods for Time-Scaling of Speech", retrieved from <http://citeseerx.ist.psu.edu/viewdoc/summary?doi=10.1.1.128.7991> on Nov. 12, 2012, 25 pages.
Verhelst, Werner et al., "An Overlap-Add Technique Based on Waveform Similarity (WSOLA) for High Quality Time-Scale Modification of Speech", retrieved from <http://citeseerx.ist.psu.edu/viewdoc/download?doi=10.1.1.202.5460&rep=rep1&type=pdf> on Nov. 12, 2012, 4 pages.
Yuan, et al., "Image Deblurring with Blurred/Noisy Image Pairs", *Proceedings of ACM SIGGRAPH*, vol. 26, Issue 3, (Jul. 2007), 10 pages.
"Non-Final Office Action", U.S. Appl. No. 13/309,982, Mar. 24, 2014, 35 pages.
"Non-Final Office Action", U.S. Appl. No. 13/310,032, Mar. 7, 2014, 21 pages.
"Non-Final Office Action", U.S. Appl. No. 13/690,755, Mar. 28, 2014, 7 pages.
"Final Office Action", U.S. Appl. No. 13/690,755, Sep. 10, 2014, 7 pages.
"Restriction Requirement", U.S. Appl. No. 13/722,825, Oct. 9, 2014, 7 pages.
"Supplemental Notice of Allowance", U.S. Appl. No. 13/310,032, Nov. 3, 2014, 4 pages.
Zhu, et al., "Fusion of Time-of-Flight Depth and Stereo for High Accuracy Depth Maps", IEEE Conference on Computer Vision and Pattern Recognition, Jun. 23, 2008, 8 pages.
"Adobe Audion", User Guide, 2003, 390 pages.
"MPEG Surround Specification", International Organization for Standardization, Coding of Moving Pictures and Audio; ISO/IEF JTC 1/SC 29/WG 11; Bangkok, Thailand, Jan. 19, 2006, 186 pages.
"Non-Final Office Action", U.S. Appl. No. 13/675,711, Mar. 11, 2015, 14 pages.
"Non-Final Office Action", U.S. Appl. No. 13/675,807, Dec. 17, 2014, 18 pages.

(56) References Cited

OTHER PUBLICATIONS

"Non-Final Office Action", U.S. Appl. No. 13/681,643, Jan. 7, 2015, 10 pages.
"Non-Final Office Action", U.S. Appl. No. 13/690,755, Mar. 2, 2015, 8 pages.
"Non-Final Office Action", U.S. Appl. No. 13/720,258, Mar. 3, 2015, 14 pages.
"Restriction Requirement", U.S. Appl. No. 13/690,724, Feb. 26, 2015, 6 Pages.
IOFFE, "Improved Consistent Sampling, Weighted Minhash and L1 Sketching", ICDM '10 Proceedings of the 2010 IEEE International Conference on Data Mining, Dec. 2010, 10 pages.
Jehan, "Creating Music by Listening", In PhD Thesis of Massachusetts Institute of Technology, Retrieved from <http://web.media.mit.eduhtristan/Papers/PhD_Tristan.pdf>,Sep. 2005, 137 pages.
"Final Office Action", U.S. Appl. No. 13/681,643, May 5, 2015, 14 pages.
"Non-Final Office Action", U.S. Appl. No. 13/722,825, Mar. 25, 2015, 17 pages.
"Notice of Allowance", U.S. Appl. No. 13/680,952, Mar. 17, 2015, 6 pages.
Su, et al., "Over-Segmentation Based Background Modeling and Foreground Detection with Shadow Removal by Using Hierarchical MRFs", Proceedings of the 10th Asian conference on Computer vision—vol. Part III, Nov. 2010, 12 pages.
Yang, et al., "Stereo Matching with Color-Weighted Correlation, Hierarchical Belief Propagation, and Occlusion Handling", IEEE Transactions on Pattern Analysis and Machine Intelligence , vol. 31 Issue 3, Mar. 2009, 13 pages.

* cited by examiner

IMAGE MATTING AND ALPHA VALUE TECHNIQUES

GOVERNMENT LICENSE RIGHTS

This invention was made with government support under Prime Award #: 1019343 Subaward #: CIF-C-149, CFDA: 47.070 awarded by The National Science 5 Foundation. The government has certain rights in the invention. This material is based upon work supported by the National Science Foundation under Grant #1019343 to the Computing Research Association for the CIFellows Project.

BACKGROUND

A variety of different operations may be applied to manipulate image data. One such example is a matting operation, in which image data for a single image is decomposed into a foreground image and a background image. A result of the matting operation may be used for a variety of different purposes, such as to extract a foreground object for placement with a different background image.

Some pixels in the image, however, may be a combination of the foreground and background images, which is describable by an alpha value as a linear combination of the images. These pixels are often referred to as mixed pixels and are typically found along an edge between the foreground and background image. Conventional matting operations, however, could result in errors in describing a correct fraction of the background and foreground images to be used for these pixels. Consequently, these conventional matting operations could result in errors, which may be viewable by a user as halos, an appearance that the foreground image was cut out manually using scissors, and so on.

SUMMARY

Image matting and alpha value techniques are described. In one or more implementations, techniques are described in which matting operations are applied to image data that is in a raw or substantially raw image format. This may be used to decompose image data into foreground and background images as well as to generate an alpha value that describes a linear combination of the foreground and background images for a respective pixel. Further, implementations are also described in which a plurality of alpha values is generated for each of a plurality of pixels in image data. These alpha values may be utilized to support a variety of different functionality, such as matting operations and so on.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Matting operations may be performed to decompose an image into a foreground image and background image, where each pixel is a linear combination of the two. Conventional matting operations often employ a pixel model that makes a linear assumption that serves as a basis for the matting operations. However, the linear assumption may not hold true due to post processing steps that may occur between an image sensor and a digital image. Consequently, errors may result from the performance of the conventional matting operations, which may be viewable as halos, edge artifacts, and so on by a user.

Image matting and alpha value techniques are described herein. In one or more implementations, matting operations are performed on image data in a substantially raw image format. This may include image data obtained directly from one or more sensors of an image capture device (e.g., camera) or image data that includes minimal post processing, e.g., in which a majority of post processing is linear. In this way, the matting operations may be performed without encountering the errors of conventional matting operations. Further description of these techniques may be found in the following sections including a discussion in relation to FIGS. 2 and 4.

One or more implementations are also described that relate to alpha values. For example, techniques are described in which a plurality of alpha values is calculated for a single pixel. These alpha values may each correspond to a respective one of a plurality of color channels. In this way, the plurality of alpha values may describe differences in the color channels, such as for blending of the foreground and background images described above which was not available for conventional alpha values in which a single alpha value is employed for each pixel. Further description of these techniques may be found in the following sections including a discussion in relation to FIG. 5.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
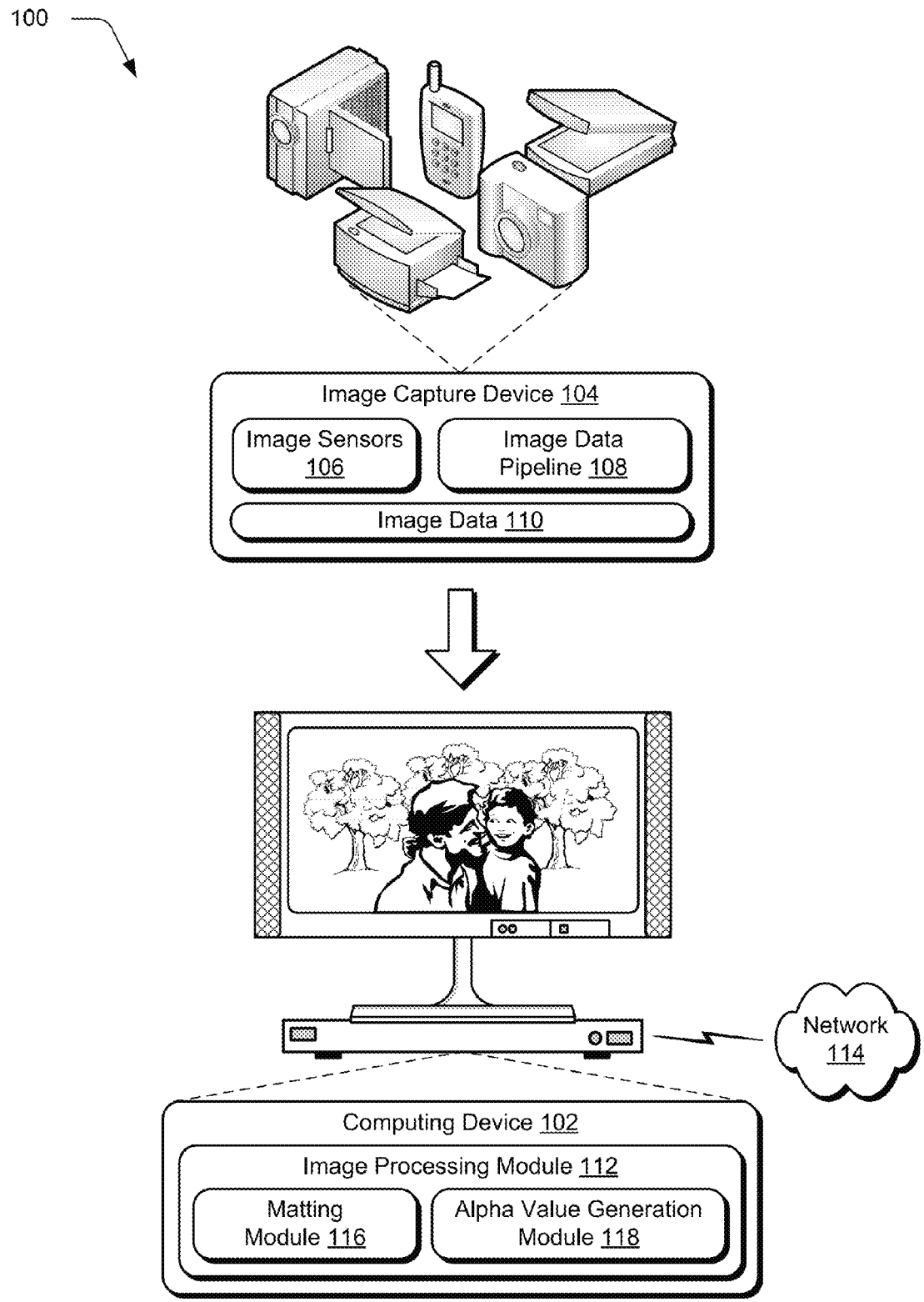
FIG. 1 is an illustration of an environment in an example implementation that is operable to employ techniques described herein relating to image matting and alpha values

FIG. 1 is an illustration of an environment 100 in an example implementation that is operable to employ techniques described herein. The illustrated environment 100 includes a computing device 102 and an image capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 9.

The image capture device 104 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device 102, e.g., for a tablet configuration, smart phone as illustrated, and so forth.

The image capture device 104 is illustrated as including image sensors 106 and an image data pipeline 108 that are each configured to form image data 110. For example, the image sensors 106 may be configured to capture images using a Bayer pattern or other configurations. Therefore, in this instance, the image data 110 generated by the image sensors 106 may be considered to be in a raw image format. Raw image format may also describe pixel values that are read from the image sensors 106 that are linear in an amount of light that fell on a respective image sensor in a wavelength range.

The image data 110 may also be partially processed by an image data pipeline 108 using a variety of different operations. These operations may include operations in which the image data 110 is considered to remain in a substantially raw image format. Examples of these operations include interpolation of the image data in the raw format (e.g., a Bayer pattern) into a red, green, and blue image format, de-mosaicking, and linear processing operations. The image data pipeline 108 may also perform operations in which the image data 110 is not in a raw or substantially raw image format, such as to perform gamma correction, sharpening, de-noising, or other non-linear operations.

Thus, image data 110 in a raw or substantially raw image format (e.g., which is raw or may include minimal processing) is in a form that is minimally processed from the image sensors 106 and thus is not in an image format that is ready to be printed or edited with a bitmap graphics editor. In this way, image data 110 in a raw or substantially raw image format may be considered a digital negative in that it acts similar to negatives in film photography but is not directly usable as an image, generally. Because image data 110 in a raw or substantially raw image format may conserve information of an original image as captured by the image sensors 106, this information may be leveraged to support a variety of features.

For example, the image data 110 may be obtained by an image processing module 112. As before, although the image processing module 112 is illustrated as being implemented on a separate device it should be readily apparent that other implementations are also contemplated in which the image sensors 106 and image processing module 112 are implemented on the same device. Further, although illustrated as being provided by a computing device 102 in a desktop configuration, a variety of other configurations are also contemplated, such as remotely over a network 114 as part of a web platform as further described in relation to FIG. 9.

Regardless of where implemented, the image processing module 112 is representative of functionality that is configured to process the image data 110. Examples of such functionality in FIG. 1 include a matting module 116 and an alpha value generation module 118. The matting module 116 is representative of functionality to perform one or more matting operations. These include operations to decompose the image data 110 into a foreground image, background image, and alpha values. The alpha value generation module 118 is representative of functionality that is usable to compute one or more alpha values, which as previously stated may be used to describe a blending of the foreground and background images to form a "mixed" pixel. For example, the alpha value generation module 118 may be employed to calculate an alpha value for each color channel of a pixel. In the following discussion, examples of operation of the matting module 116 are first described and are followed by examples of operation of the alpha value generation module 118.

Figure 2:
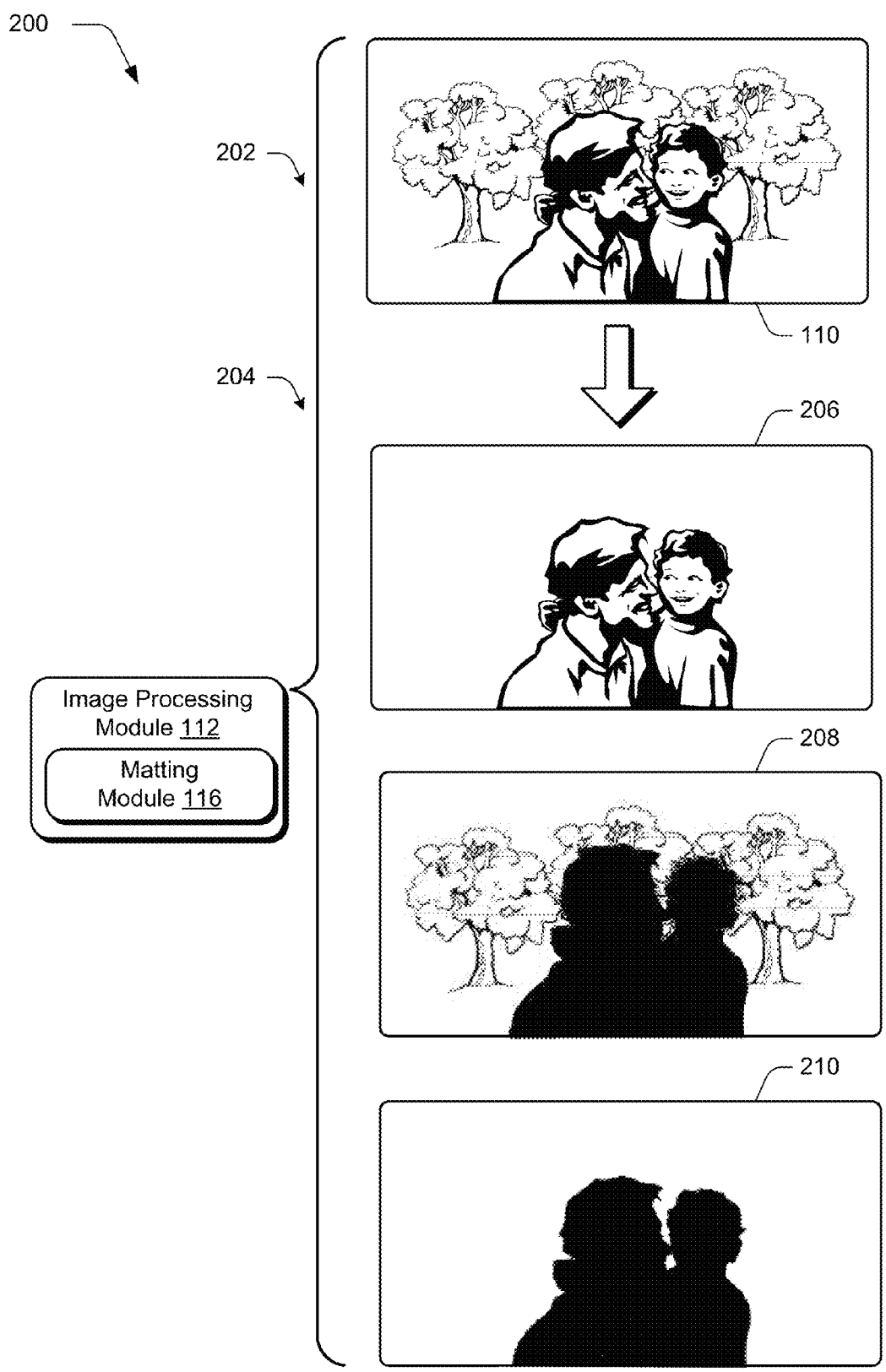
FIG. 2 depicts a system in an example implementation in which operation of a matting module of FIG. 1 is shown to perform one or more matting operations.

FIG. 2 depicts a system 200 in an example implementation in which operation of the matting module 116 of FIG. 1 is shown to perform one or more matting operations. The system 200 is shown using first and second stages 202, 204 of processing of image data 110. At the first stage 202, image data 110 is obtained, e.g., directly from one or more image sensors 106, partially processed by the image data pipeline 108 or other functionality, and so on.

The matting module 116 may employ techniques in which a single image "I" included in the image data 110 is assumed to be a composite of a foreground image "F" with a background image "B", where each pixel is a linear combination of the two described by one of more alpha values. Accordingly, the matting module 116 may perform one or more matting operations to estimate the foreground image, background image and alpha values that described blending of the images for each pixel.

A result of this is illustrated in the second stage 204, which shows a foreground image 206, a background image 208, and a plurality of alpha values 210. The plurality of alpha values 210 is illustrated as forming an alpha value matte that describes alpha values for respective pixels to be formed using the foreground and background images 206, 208. The decomposition performed by the matting module 116 may be used to support a variety of different functionality, an example of which is described and shown in a corresponding figure as follows.

Figure 3:
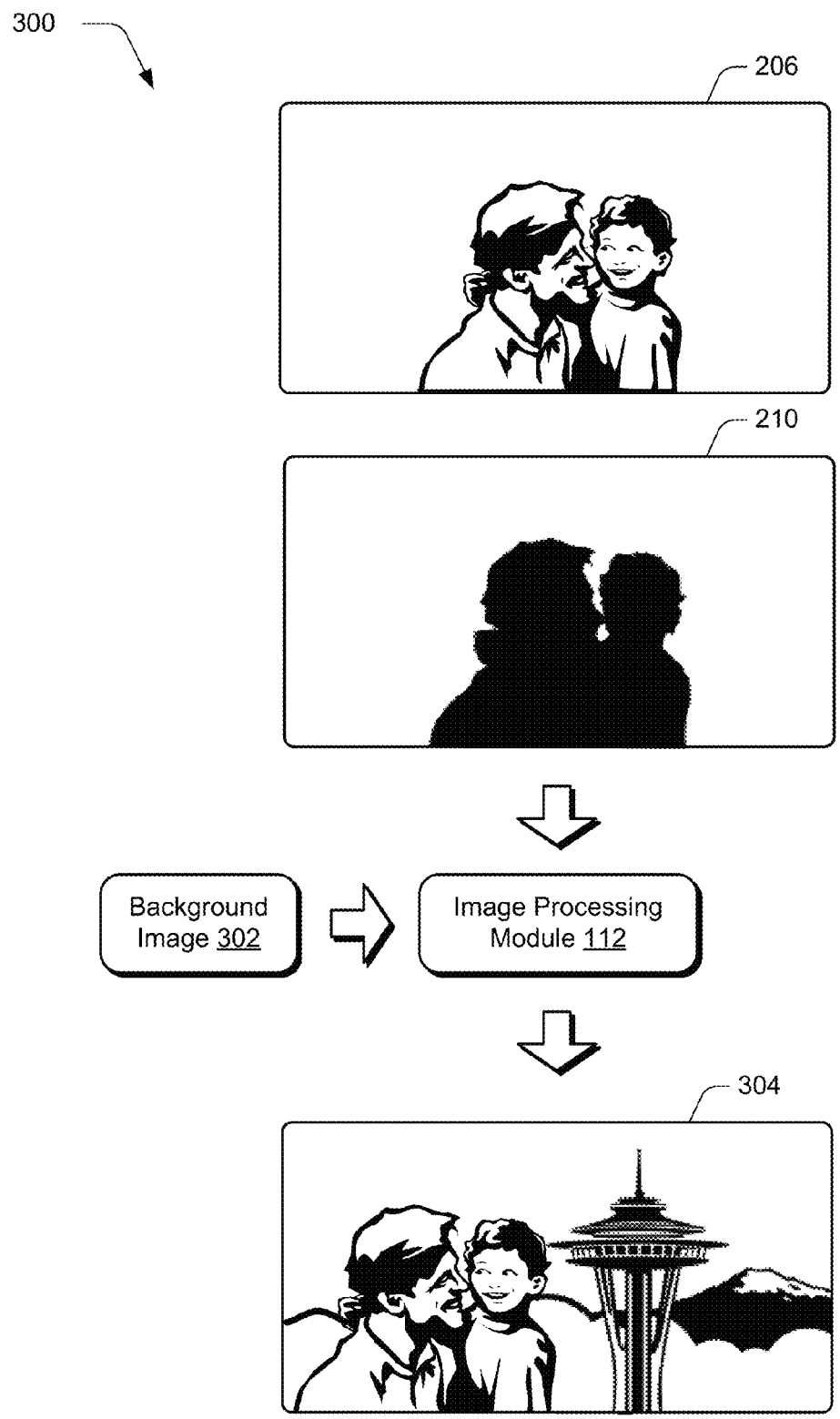
FIG. 3 depicts a system showing example operation of an image processing module of FIG. 1 to composite images using decomposed images generated by the matting module of FIG. 2.

FIG. 3 depicts a system 300 showing example operation of the image processing module 112 to composite images using decomposed images generated by the matting module 116 of FIG. 2. In this example, the image processing module 112 uses the foreground image 206 and alpha values 210 generated in FIG. 2.

A new background image 302 is then used to form a new image 304 that includes the foreground image 206 and the new background image 302 using the alpha values 210 to blend the images. In this way, the new image 304 is included with the foreground image 206 in a manner that appears realistic to a user by blending the mixed pixels as described by the alpha values. Other examples of operations are also contemplated which may leverage the decomposed images formed by the matting module 116 as further described below.

In one or more implementations, each image "I" is modeled at each pixel "p" to describe a foreground image "F" and background image "B" using the following expression to describe a pixel "p":

$$I_p = \alpha_p F_p + (1 - \alpha_p) B_p$$

Each color channel in an image (e.g., an RGB image) may be modeled separately and thus this equation may be used for each color channel. However, this may cause the image matting problem to be under-constrained. For example, these techniques are used to estimate seven unknown values, e.g., $F_R, F_G, F_B, B_R, B_G, B_B, \alpha$, using three equations to describe a RGB color space.

Image matting techniques such as shared matting, global sampling matting, closed-form matting, and so on assume a linear pixel model as described in the above expression. However, this linear assumption may not hold, given the post processing steps that occur between the image sensors 106 and image data 110. This may include operations performed by the image data pipeline 108 or image processing module 112 which include an interpolation process, gamma correction, sharpening and de-noising filters, and so on.

The interpolation operation, for instance, may involve a transformation from a single channel raw image (e.g., Bayer pattern) to a three channel RGB image. The image sensors 106, for instance, may capture a single color at each pixel that follows a Bayer pattern. Each two by two block of pixels in the Bayer pattern typically contains one red value, two green values and one blue value. Therefore, the interpolation process may be used to average values from neighboring pixels to determine the two missing color channel values at each pixel. However, this process may introduce new data values that do not follow the linear assumption described above.

In another instance, gamma correction is the process of transforming the image data 110 according to a curve, so the resulting image data no longer follows the linear assumption either. In addition, the image data pipeline 108 used to convert image data from raw to RGB may include operations to sharpen and de-noise images. These operations may involve applying local filters to the image data, so the resulting image data also violates the linear assumption.

Figure 4:
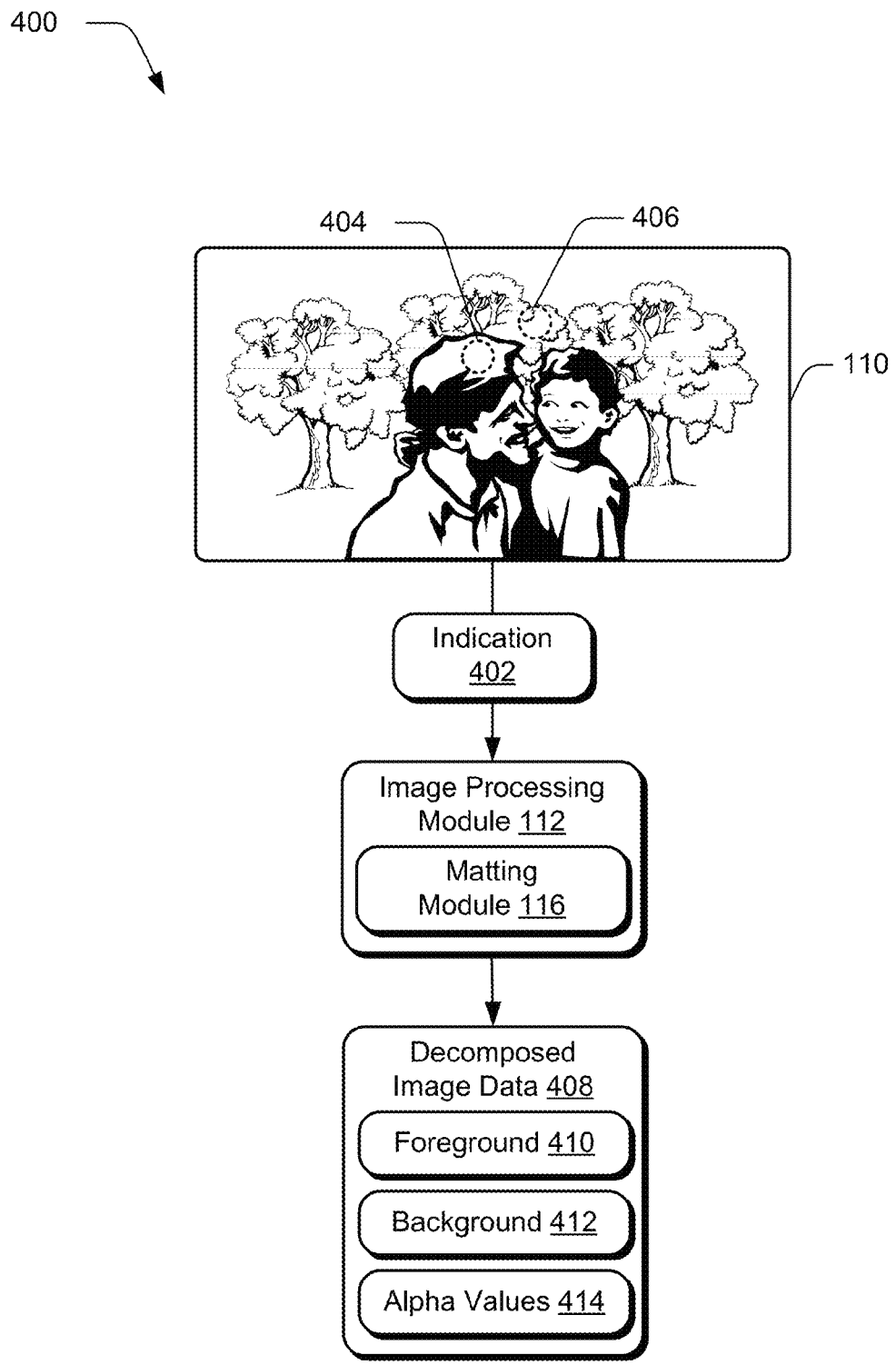
FIG. 4 depicts a system in an example implementation in which decomposition of the image data by the matting module is performed.

FIG. 4 depicts a system 400 in an example implementation in which decomposition of the image data 110 by the matting module 116 is performed. The image processing module 112 may obtain image data 110 as previously described, such as in a substantially raw image format. The matting module 116 may also receive an indication 402 of portions of the image data that likely correspond to a foreground image and background image. For example, a user may indicate a portion 404 of the image formed by the image data 110 that is part of the foreground image and another portion of the image 406 that is part of the background image. The matting module 116 may then use these indications as a basis to form decomposed image data 408 that includes the foreground 410, background 412, and alpha values 414.

However, different amounts of processing may affect matting operations performed by the matting module 116 in different amounts. For example, matting operations performed for three different image types may be compared. The first, RGB, is a standard RGB image saved by an image capture device 104 during image capture and processed by the image data pipeline 108. Accordingly, this may include use of non-linear post-processing steps.

The second, L-RGB, is a linear RGB image. This may be generated by converting raw image data captured by the image sensors 106 using primarily linear operations. For example, an Adobe® DNG Converter may be used to perform this conversion. The third, D-RGB, is an image formed from image data that has been processed by de-mosaicking process, exclusively.

Figure 5:
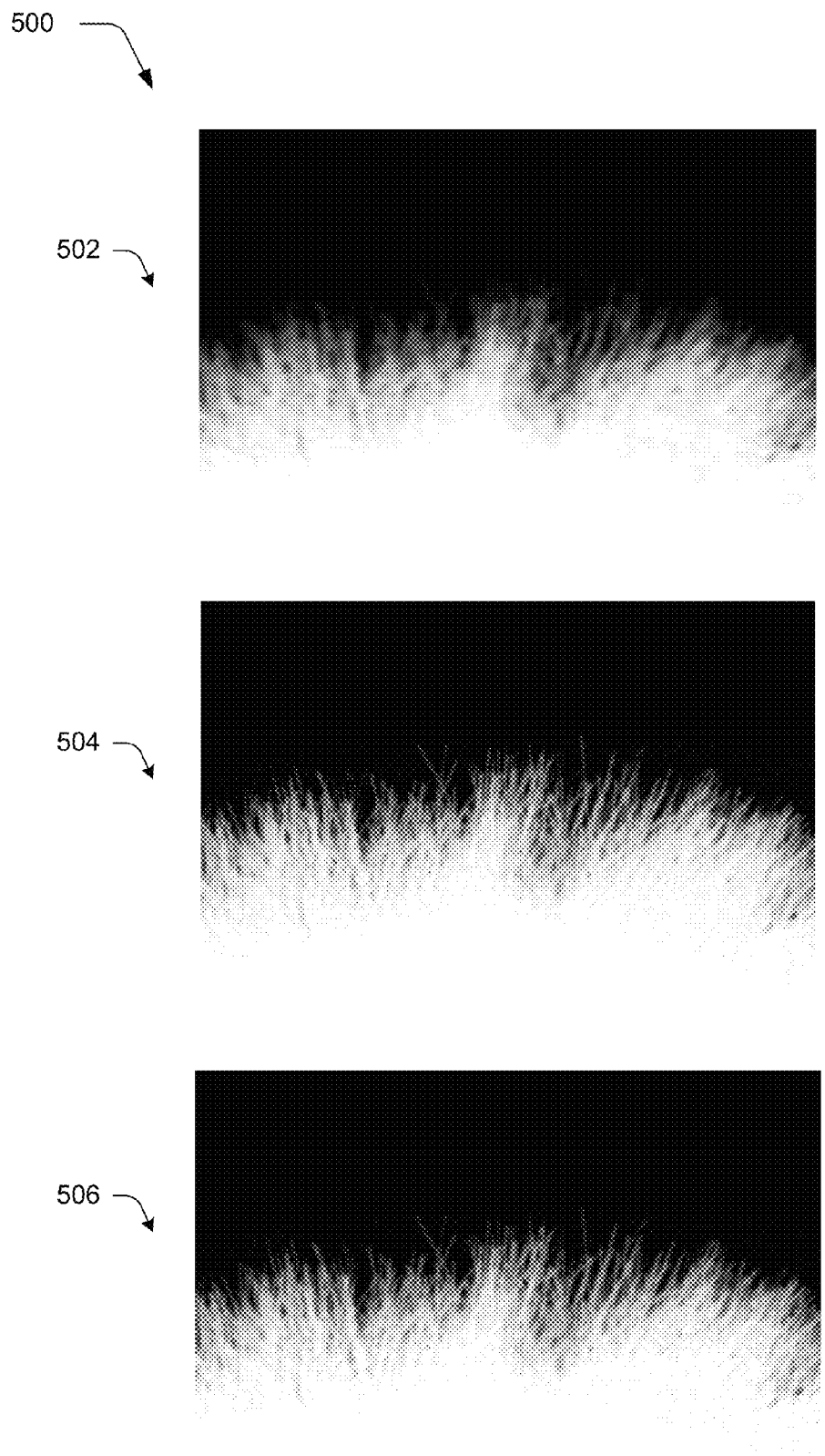
FIG. 5 is an illustration of example alpha images.

An example alpha image is shown the example implementation 500 of FIG. 5. In this example, a result of processing using a shared sampling matting operation is shown for an RGB image 502, L-RGB image 504, and D-RGB image 506. In this example, increased detail viewable for the hair in the L-RGB image 504 and the D-RGB image 506 in comparison with the RGB image 502 shows that use of image data that is less processed and closer to the raw data may significantly improve image matting results.

A variety of other image formats may also be employed, an example of which is referred to as a stacked-raw image. This image may be generated by converting a Bayer pattern or other raw image format into a single pixel having a plurality of color channels. The image processing module 112, for instance, may take each two-by-two block in the raw image, which includes the values "r," "$g_1$," "$g_2$," and "b" and generate a single pixel from these values having a plurality of color channels. The new pixel, for instance, may be generated to include four color channels that include "r," "$g_1$," "$g_2$," and "b." In another instance, a three channel version can also be generated by averaging the green components to get "r," "$g_{ave}$," and "b." Both instances result in an image which is half of the width and height of the original image. The stacked-raw image format has also been shown to have better image matting results than those obtained from RGB image data.

Existing online benchmarks for the image matting do not address use of raw data. Accordingly, to work in this space, raw images of scenes may be collected and used to produce corresponding ground truth images for alpha and the foreground. For example, images may be collected of the same foreground object against different known backgrounds in order to over constrain the problem. To do this, a foreground object may be placed in front of a display device, e.g., a large monitor. Images of the foreground object may then be captured against multiple backgrounds. The foreground object may then be removed and images may then be captured of the same backgrounds.

Given these images $I_1:I_n$ and $B_1:B_n$, the following set of equations may be employed:

$$I_1 = \alpha F + (1 - \alpha) B_1$$
$$I_2 = \alpha F + (1 - \alpha) B_2$$
$$I_3 = \alpha F + (1 - \alpha) B_3$$
$$\ldots$$
$$I_n = \alpha F + (1 - \alpha) B_n$$

There are "n" equations and two unknowns ($\alpha$ and F), which may then be calculated using the set of equations. Accordingly, the solution to this set of linear equations may be written as a closed-form solution. For example, the following solution may be used for the calculation of alpha:

Let, $$mean_B = \frac{1}{n}\Sigma_i I_i$$

$$dI_i = I_i - mean_B$$

$$mean_B = \frac{1}{n}\Sigma_i B_i$$

$$dB_i = B_i - mean_B$$

$$\alpha = 1 - [\Sigma_i(B_i^T * dI_i)/\Sigma_i\|dB_i\|^2]$$

The following solution may be used for the calculation of F:

$$g = \Sigma_i(I_i - B_i)$$

$$h = -\Sigma_i B_i^T(I_i - B_i)$$

$$u = \Sigma_i B_i$$

$$beta^2 = \Sigma_i\|B_i\|^2$$

$$y = beta^2 g + hu$$

$$Z = u * u^T$$

$$d = \Sigma_i\|dB_i\|^2$$

$$mean_B = \frac{1}{n}\Sigma_i B_i$$

$$dB_i = B_i - mean_B$$

$$gamma = \frac{1}{n*d}$$

$$\hat{F} = \frac{1}{n*beta^2}*(y + gamma*Z*y)$$

$$\hat{F} = \alpha F$$

Accordingly, the above estimated alpha may be used to solve for F.

Figure 6:
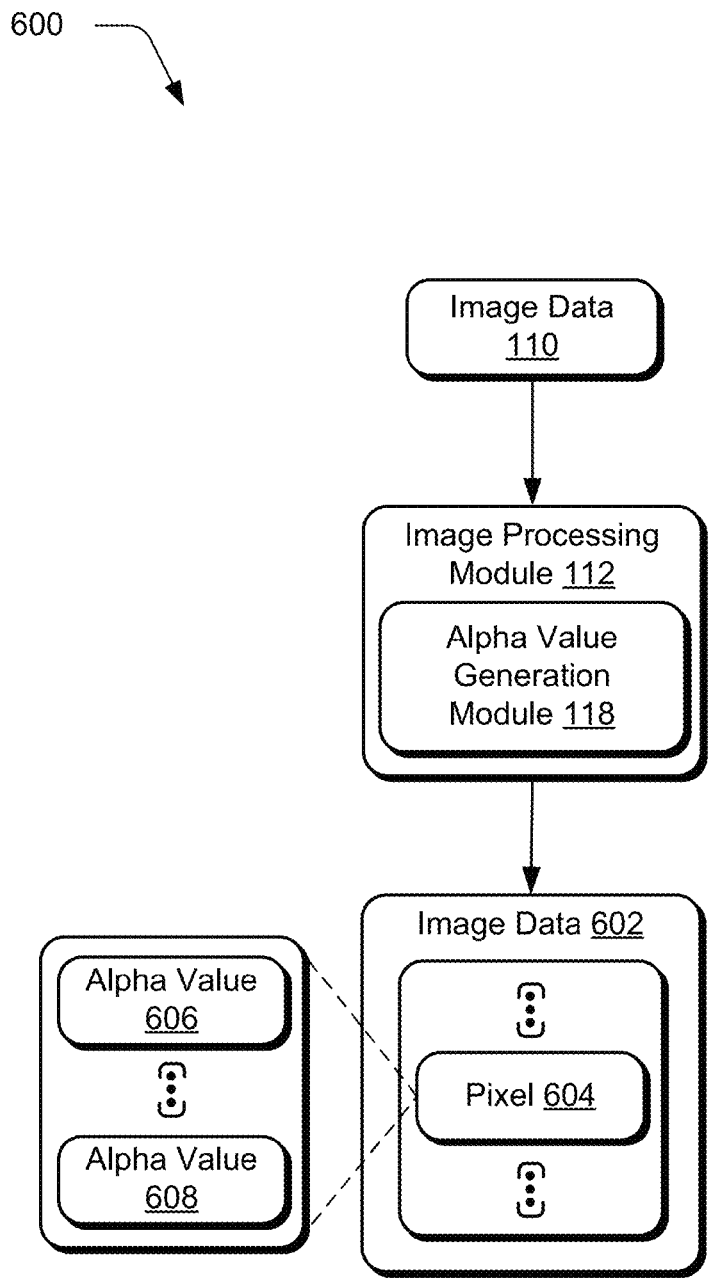
FIG. 6 depicts a system in an example implementation showing operation of an alpha value generation module of FIG. 1.

FIG. 6 depicts a system 600 in an example implementation showing operation of the alpha value generation module 118 of FIG. 1. In this example, the image processing module 112 obtains image data 110. The image data 110 may be configured in a variety of ways, such as in raw or substantially raw image formats as before as well as non-raw formats, e.g., in an RGB color space and so on.

As illustrated the alpha value generation module 118 may be used to generate image data 602 for a plurality of pixels. An example of a single one of the pixels is illustrated as pixel 604. As shown, this single pixel 604 is associated with a plurality of alpha values 606, 608, which may be configured in a variety of ways to support functionality relating to the image data 602.

In one such example, each of the alpha values 606, 608 for the pixel 604 may correspond to a respective one of a plurality of color channels. Thus, these alpha values may describe variances that may be observed based on wavelength. For instance, pixel 604 may have different alpha values for red, green, and blue color channels, although other instances are also contemplated for pixels that described different collections of color channels. These alpha values may be employed to support a variety of functionality.

The image processing module 112, for instance, may utilize extend a shared sampling algorithm to estimate three alpha values per pixel, e.g., using raw or other image formats. The shared sampling algorithm may be employed to estimate foreground, background and alpha values for each pixel in the unknown region of a given trimap.

At a high level, the shared sampling algorithm picks the best samples from the known foreground and known background regions and uses the samples to compute an alpha estimate using two steps. The first step is a sampling step in which a best foreground/background (F/B) pair is chosen for a pixel. This may include estimation of known foreground and background pixels that are closest to it. For example, a user may indicate a portion of an image as a foreground or background and thus supplies a known alpha value of one or zero for those pixels. This portion may thus be used as a basis for estimating values for the "F/B" pair through comparison with the indicated portion as well as an alpha value that describes blending of this pair.

Next, in the sharing step an analysis is performed for these pixels by analyzing estimates of neighboring pixels and selecting values (e.g., foreground and/or background values) from the neighboring pixels if it is determined that those estimates are more likely accurate. A technique may be employed in which an assumption is employed that neighboring pixels are similar for a defined neighborhood. For example, the values of a pixel may be compared with values of neighboring pixels to determine whether the values are consistent, one to another. If not, one or more values (e.g., foreground and/or background values) may be chosen for the pixel. It should be readily apparent, however, that other examples are also contemplated without departing from the spirit and scope thereof.

Accordingly, the energy function is changed to adapt the shared sampling algorithm to estimate three separate alpha values. The original energy function in the sharing step relies on the matting equation error over all three color channels "c" as follows:

$$e_p = \sum_c (I_{pc} - (\alpha_{pc}F_{pc} + (1 - \alpha_{pc})B_{pc}))^2$$

The energy function may employ the plurality of alpha values as follows. Given a pixel "p" and a neighborhood "n" around "p," the determination of the likely accuracy of an estimate may be based at least in part on how closely the alpha values fit along a line. For example, points are expected to have a linear relationship when plotting of $\alpha_p = (\alpha_r, \alpha_g, \alpha_b)$ for each pixel in "n" in three dimensions. Accordingly, this may be used as a constraint to determine likely accuracy of a sample by determining a best fit line to the alpha values for each pixel in "n" and then calculating the sum of the distances from each pixel to that line.

The energy function may also employ an assumption that alpha values are to fall between zero (total transparency) and one (no transparency). Therefore, in the sharing step, the energy function may be expressed as follows:

energy=$w_1$*totalDistToLine+$w_2$*penalty where "$w_1$" and "$w_2$" are weights that may be used to adjust a contribution of both terms, "totalDistToLine" is the distance from the linear relationship described above for the best fit line, and the "penalty" is a cost assigned if a computed alpha value is less than zero or greater than one. Therefore, in operation this function is to be minimized by finding the sample foreground/background pair that has the lowest value. A low value means that the alpha estimates are in the valid range and the alpha estimates over the local neighborhood form a good line.

The discussion now returns to FIG. 3. As previously described, the image matting techniques and plurality of alpha values may be used to support a variety of different functionality. One example of which is shown in the compositing in an image 304 in FIG. 3. Given the advantages described above of computing the alpha matte from raw images, compositing may also be performed as part of this workflow. The plurality of alpha values, for instance, may be leveraged to allow a portion of the foreground image 206 to be composited in a new background image 302 to be composited in a second image in a manner that appears to have increased physical accuracy over conventional RGB image techniques.

For example, an image $I_1^{raw}$ may be obtained in a raw image format. A foreground image "$F_1^{raw}$," background image "$B_1^{raw}$," and alpha value "$\alpha_1^{raw}$" may be computed using the techniques described above. The user may then transform the image as desired, such as by using the image data pipeline 108, image processing module 112, and so on. The estimated foreground image "$F_1^{raw}$" may then be transformed according to an image data pipeline "$p_1$" or other module to form "$F^{rgb}$."

Another pipeline "$p_2$" may be used to transform an image into which the portion of the foreground image is to be composited, e.g., to transform background image "$B_2^{raw}$" from raw to an RGB image format, e.g., to form "$B_2^{rgb}$". The portion of the foreground image "$F^{rgb}$" may also be converted back into a raw image format "$F_2^{raw}$" using transforms of the other pipeline "$p_2$." Likewise, the background image "$B_2^{rgb}$" may also be converted back into a raw image format, e.g., "$B_2^{raw}$" using the other pipeline "$p_2$."

The compositing operation may then be performed using raw images, as shown in the following expression:

$$C_2^{raw} = \alpha_1^{raw} F_2^{raw} + (1 - \alpha_1^{raw}) B_2^{raw}$$

Thus, at this point a composited image is formed in a raw image format. This image format may then be converted to another format, such as through use of the other pipeline "$p_2$" to form composite image "$C_2^{rgb}$." In this way, transformations made to the images may be preserved yet still support a look that is realistic to a viewer of the image.

Example Procedures

The following discussion describes image matting and alpha value techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
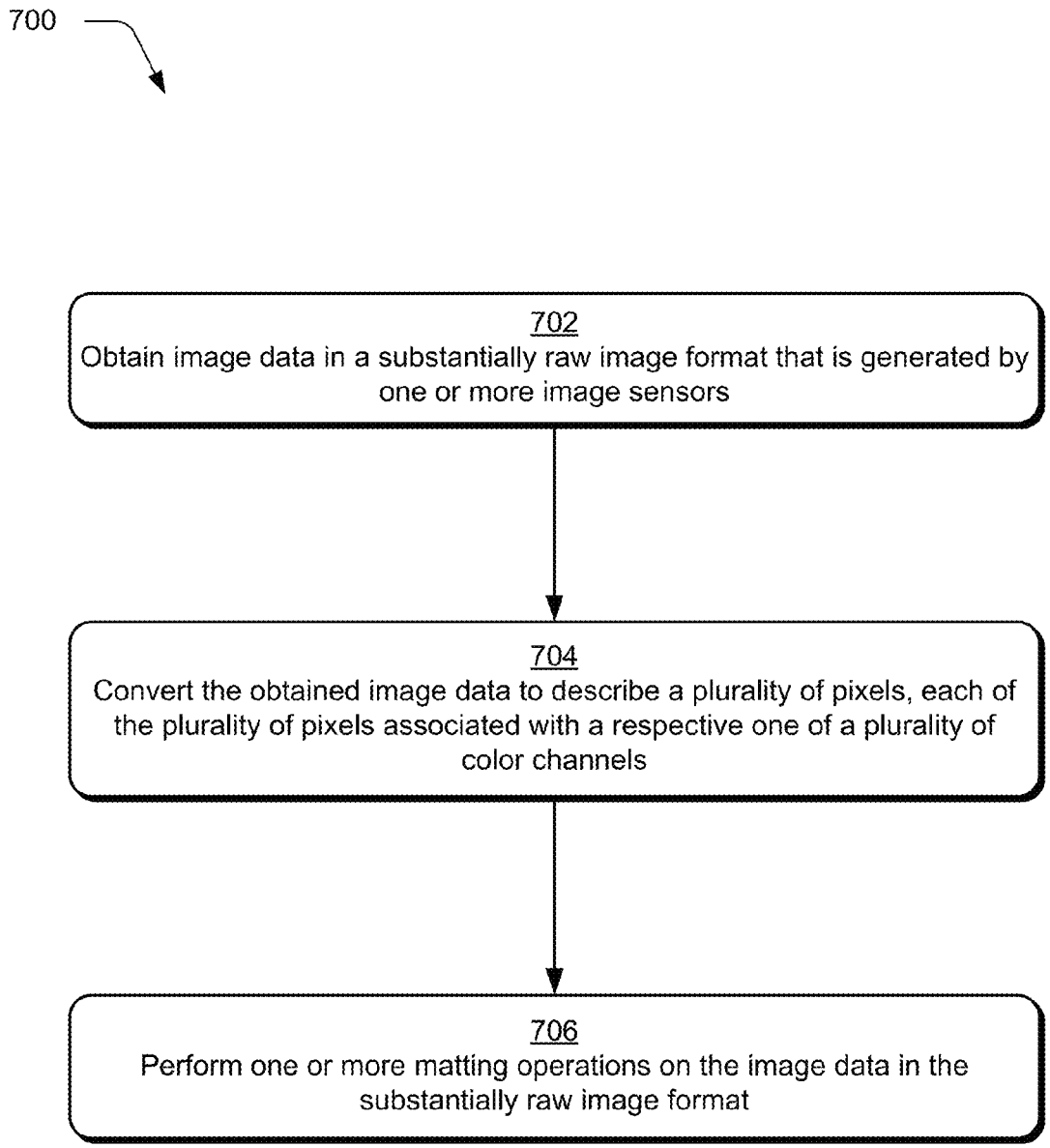
FIG. 7 is a flow diagram depicting a procedure in an example implementation in which one or more matting operations are performed using substantially raw image data.

FIG. 7 depicts a procedure 700 in an example implementation in which one or more matting operations are performed using substantially raw image data. Image data is obtained in a substantially raw image format that is generated by one or more image sensor (block 702). For example, this may include raw image data that is obtained in a form output directly by the image sensors 106 of an image capture device 104, e.g., describing a Bayer pattern. This may in raw image data that includes values obtained directly from a sensor and are linear in describing an amount of light encountered by the sensor, such as within a particular range of wavelengths.

This may also include image data in a substantially raw image format, such as in a format that has encountered minimal processing by one or more modules, such as an image data pipeline 108, image processing module 112, and so on. Examples of substantially raw image formats include a red, green, blue image format that was formed through interpolation of a Bayer pattern, image data that has been processed using de-mosaicking, operations that involve linear processing, and so on. Thus, reference to a substantially raw image format may include image data in a raw image format.

In one or more implementations, the obtained image data is converted to describe a plurality of pixels, each of the plurality of pixels associated with a respective one of a plurality of color channels (block 704). For example, the single pixel may be configured to describe each color channel in a raw image format, e.g., four color channels referencing a Bayer pattern, may be configured to average one or more of the channels, e.g., three color channels of the Bayer pattern in which the green color channels are averaged, and so forth. In this way, a stacked-raw image format may be generated for further processing.

One or more matting operations are performed on the image data in the substantially raw image format (block 706). This may include performing the operations on the image data obtained at block 702, the converted image data obtained at block 704, and so on. The one or more matting operations may then be used to decompose the image data, such as into a foreground image, background image, and alpha values. Further, the matting operations may be performed by leveraging a plurality of alpha values for each pixel, an example of which may be found in the following discussion and associated figure.

Figure 8:
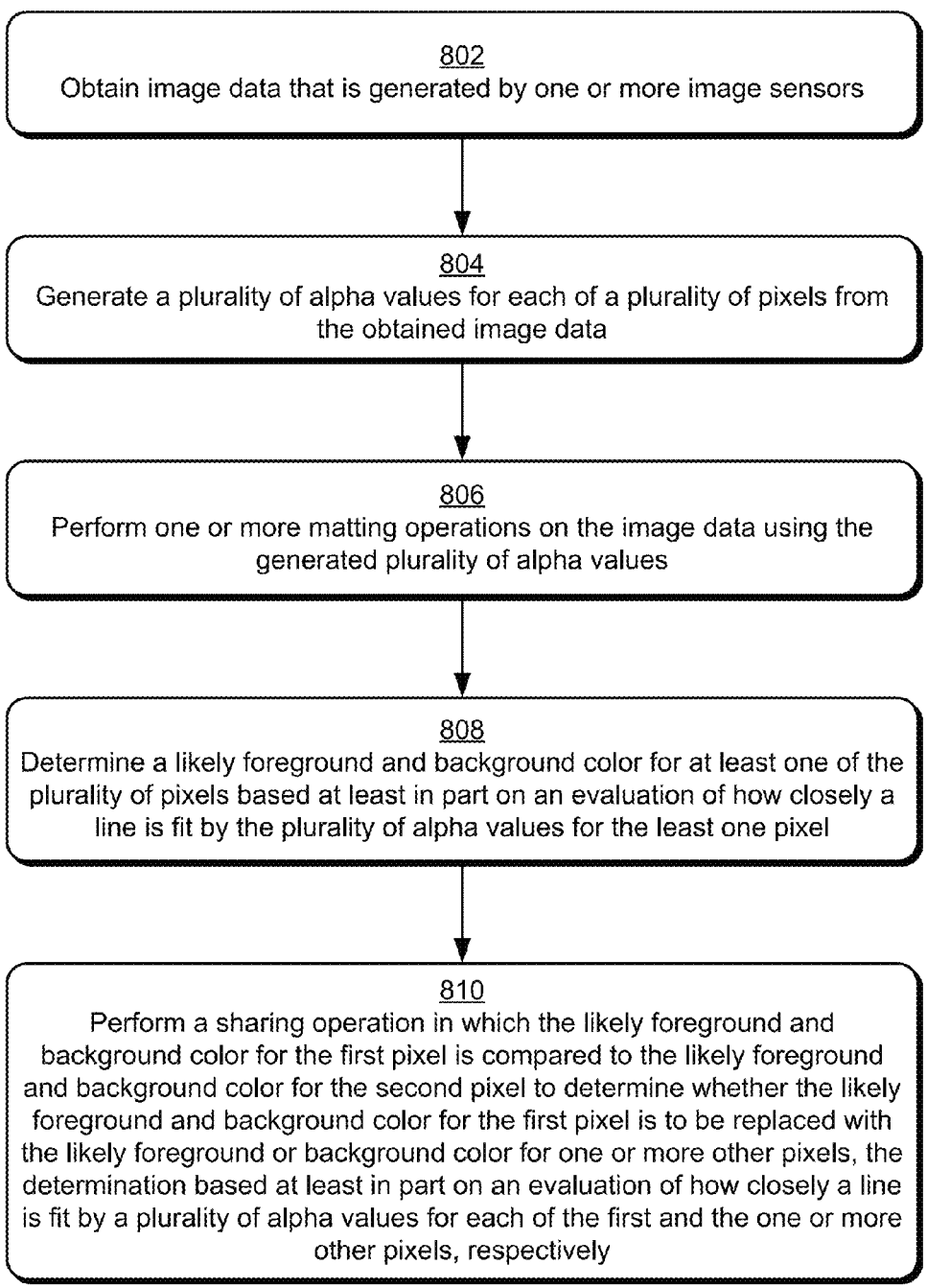
FIG. 8 is a flow diagram depicting a procedure in an example implementation in which a plurality of alpha values is generated for a single pixel in image data.

FIG. 8 is a flow diagram depicting a procedure 800 in an example implementation in which a plurality of alpha values is generated for a single pixel in image data. Image data is obtained that is generated by one or more image sensors (block 802). This may include data formatting in a raw or substantially raw image format as well as image formats that are not raw, such as a conventional RGB image format.

A plurality of alpha values is generated for each of a plurality of pixels from the obtained image data (block 804). As shown in FIG. 6, image data 602 may be generated in which each pixel 604 is associated with a plurality of alpha values 606, 608. This may be performed to generate an alpha value for each color channel of a pixel. In this way, the alpha values may describe differences in the color channels that could not be performed using conventional techniques involving a single alpha value. These alpha values may be utilized to support a variety of different functionality.

For example, one or more matting operations may be performed on the image data using the generated plurality of alpha values (block 806). This may be performed using a variety of different techniques, an example of which includes a shared sampling operation, which may be performed in two steps. In a first step, a like foreground and background color for at least one of a plurality of pixels is determined based at least in part on an evaluation on how closely a line is fit by the plurality of alpha values for the at least one pixel (block 808). Thus, in this first step the plurality of alpha values may be used to estimate colors for a pixel.

In a second step, a sharing operation is performed in which the likely foreground and background color for a first one of the pixels is compared to the likely foreground and background color for one or more other pixels. This comparison is performed to determine whether the likely foreground and background color for the first pixel is to be replaced with the likely foreground and/or background color from one or more other pixels, the determination based at least in part on an evaluation of how closely a line is fit by a plurality of alpha values for each of the first and one or more other pixels, respectively (block 810). Thus, in the second step the plurality of alpha values may also be used in the sharing operation to compare the pixels to each other. A variety of other matting and other operations are also contemplated that may leverage use of a plurality of alpha values, such as global sampling matting, closed-form matting, and so on.

Example System and Device

Figure 9:
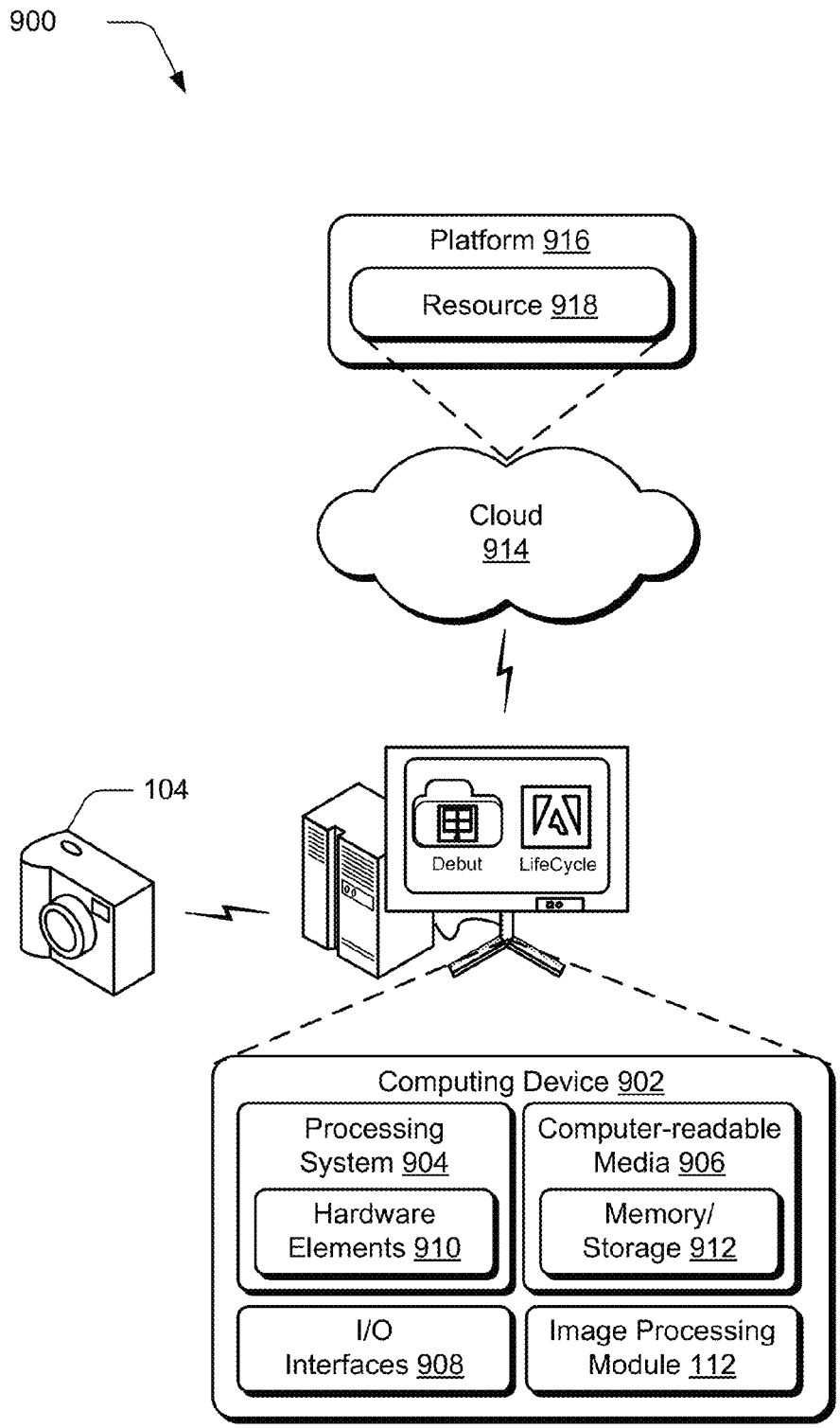
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the image processing module 112, which may be configured to process image data, such as image data captured by an image capture device 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    obtaining image data in a raw image format that is generated by one or more image sensors;
    converting the obtained image data to describe a plurality of pixels, each said pixel associated with a respective one of a plurality of color channels; and
    performing one or more matting operations on the converted image data.

2. A method as described in claim 1, wherein the performing of the one or more matting operations is used to decompose the converted image data into a foreground image, a background image, and one or more alpha values.

3. A method as described in claim 1, wherein gamma correction, sharpening, or de-noising are not performed on the image data during the converting.

4. A method as described in claim 1, wherein the image data has been interpolated from a Bayer pattern to a red, green, blue image format during the converting.

5. A method as described in claim 1, wherein de-mosaicking has been performed during the converting.

6. A method as described in claim 1, wherein non-linear processing is not performed on the image data during the converting.

7. A method as described in claim 1, wherein the performing one or more matting operations on the converted image data includes generating a plurality of alpha values for each of the plurality of pixels from the converted image data.

8. A method as described in claim 1, wherein the converting is performed without interpolation.

9. A method as described in claim 1, wherein the converting is performed to convert at least one Bayer pattern described in the obtained image data into a single said pixel.

10. One or more non-transitory computer-readable storage media comprising instructions that are stored thereon that, responsive to execution by a computing device, causes the computing device to perform operations comprising:
    obtaining image data in a raw image format that is generated by one or more image sensors, the image data obtained without performing non-linear post processing; and
    performing one or more operations on the obtained image data in the raw image format to decompose the image data into a foreground image, a background image, and one or more alpha values.

11. One or more non-transitory computer-readable storage media as described in claim 10, wherein the one or more operations include a matting operation.

12. One or more non-transitory computer-readable storage media as described in claim 10, wherein the performing of the one or more operations includes generating a plurality of alpha values for each of a plurality of pixels from the image data.

13. A system comprising an image editing module, the image editing module configured to perform operations comprising:
    obtaining image data comprising a single image generated by one or more sensors of an imaging device, the image data being obtained in a raw image format with minimal post processing;
    performing one or more matting operations on the obtained image data while still in the raw image format effective to decompose the obtained image data into a foreground image, a background image, and one or more alpha values.

14. A system as described in claim 13, wherein the minimal post processing includes converting the image data to describe a plurality of pixels, each said pixel associated with a respective one of a plurality of color channels.

15. A system as described in claim 14, wherein the converting the image data is performed without interpolation.

16. A system as described in claim 14, wherein the converting the image data is performed to convert the image data from at least one Bayer pattern of the one or more sensors into a single said pixel.

17. A system as described in claim 13, wherein the minimal post processing does not comprise gamma correction, sharpening, or de-noising.

18. A system as described in claim 13, wherein the minimal post processing comprises interpolating the image data from a Bayer pattern to a red, green, blue image format.

19. A system as described in claim 13, wherein the minimal post processing comprises only linear processing.

20. A system as described in claim 13, wherein the minimal post processing comprises de-mosaicking.

* * * * *